Aug. 11, 1942.        G. V. GLADVILLE        2,292,876
SILO
Filed Feb. 4, 1941        2 Sheets-Sheet 1

Inventor
Glenn V. Gladville
By Freare and Bishop
Attorneys

Aug. 11, 1942.   G. V. GLADVILLE   2,292,876
SILO
Filed Feb. 4, 1941   2 Sheets-Sheet 2
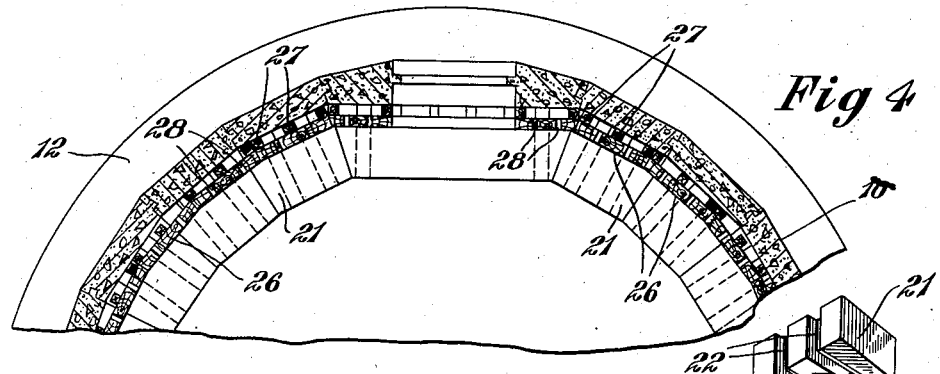
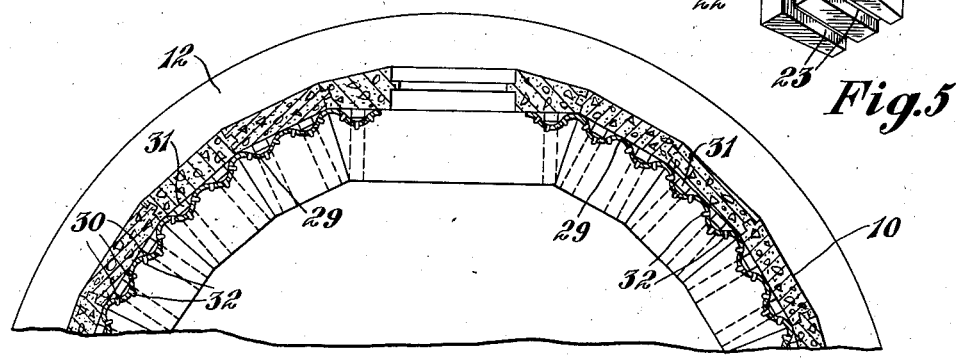
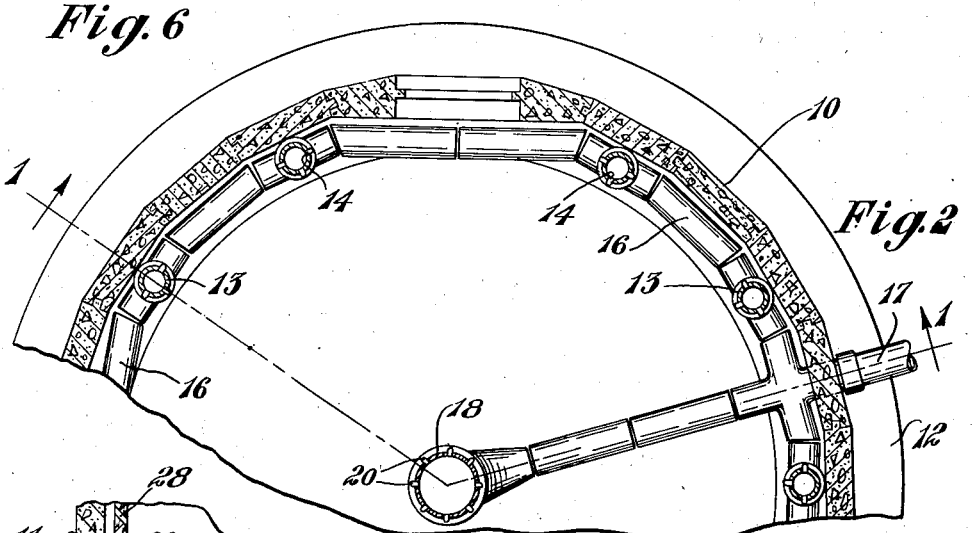
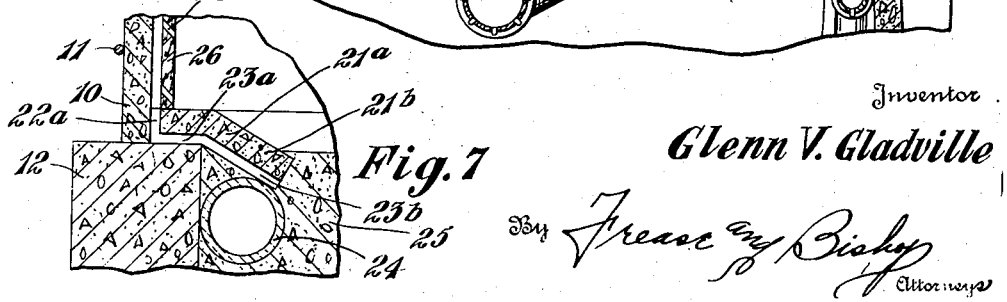
Inventor
Glenn V. Gladville Patented Aug. 11, 1942

2,292,876

UNITED STATES PATENT OFFICE 2,292,876

SILO

Glenn V. Gladville, Massillon, Ohio

Application February 4, 1941, Serial No. 377,329

10 Claims. (Cl. 20—1.4)

The invention relates to silos, and more particularly to perforate means within the lower portion of the silo for the purpose of draining off moisture from the silage and carrying it downward to drain tiles or the like for conveying it away from the silo.

Until quite recently silage was made from corn stalks, which contained just sufficient moisture to produce proper fermentation and make the best silage without any leakage or drainage of moisture. However, since the advent of grass silage, which practice has become universal, a serious problem has developed which up until the present has not been solved by either the silo manufacturer or the farmer.

It is desirable that silage contain the maximum protein and produce the maximum carotene, and it is, therefore, necessary to cut the grasses and legumes before maturity and immediately place them in the silo before they commence to wilt, and it frequently happens that the grasses are wet from dew or rain when made into silage.

This results in the grass silage containing considerably more moisture than is present in silage made from cornstalks; tests having shown that grass silage may contain anywhere from 75% to 90% of moisture, while the best silage is made when the moisture content is not above 72%.

It has been found by experience that ensilage containing more than 75% moisture not only does not properly ferment to make the best ensilage, but creates so great a pressure within the silo that the reinforcing of the silo will not withstand the same, opening the joints of the silo so that the same will leak, thus not only damaging the silo, but causing a very obnoxious odor around the dairy barn to which the silo is attached.

Experiments have shown that silage containing 70% moisture will not drain and does not create any internal pressure which injures the silo or causes the same to leak, and this moisture content will be held by the mass of feed, and ferments to make the best ensilage.

The object of the present invention is to provide means for extracting the surplus and objectionable moisture from the silage so as to prevent damage to the silo and leakage of the surplus moisture through the vents thereof, thus eliminating the objectionable odors from around the dairy barn.

Another object of the invention is to provide drainage means in the lower portion of the silo, in which the surplus moisture accumulates, to carry this surplus moisture away without damage to the silo.

A further object is to provide perforate drainage pipes in the lower portion of the silo to convey the surplus moisture away from the silage.

Still another object is to provide means adjacent to the perforations to prevent them from becoming clogged by the finely cut silage.

A still further object is to provide drainage means around the inner walls of the silo preferably near the lower portion thereof to receive and carry away surplus moisture in the silage.

A still further object of the invention is to provide a perforate inner lining spaced from the inner walls of the lower portion of the silo.

Another object is to provide drainage means at the bottom of the silo for carrying out the surplus moisture.

The above objects together with others which will be apparent from the drawings and following description may be attained by constructing the improved silo drainage device in the manner illustrated in the drawings in which Figure 1 is a vertical longitudinal section through the lower portion of a silo provided with perforate drainage pipes for carrying away surplus moisture, taken on the line 1—1, Fig. 2;

Fig. 2 is a transverse sectional view taken as on the line 2—2, Figure 1;

Fig. 4 is a transverse sectional view taken as on the line 4—4, Fig. 3;

Fig. 5 is a detached perspective view of one of the drainage blocks located at the bottom of the perforate lining shown in Figs. 3 and 4;

Fig. 6 is a view similar to Fig. 4, showing a modified form of perforate lining; and Fig. 7 is a fragmentary, vertical sectional view showing a modified form of drainage block.

Similar numerals refer to similar parts throughout the several views.

The invention may be mounted within the lower portion of any usual and well-known form of silo, indicated generally at 10, which may be constructed of cement blocks, tile, wood, metal or other material customarily used for the purpose, and reinforced with the usual reinforcing hoops or bands as indicated at 11.

Figure 1:
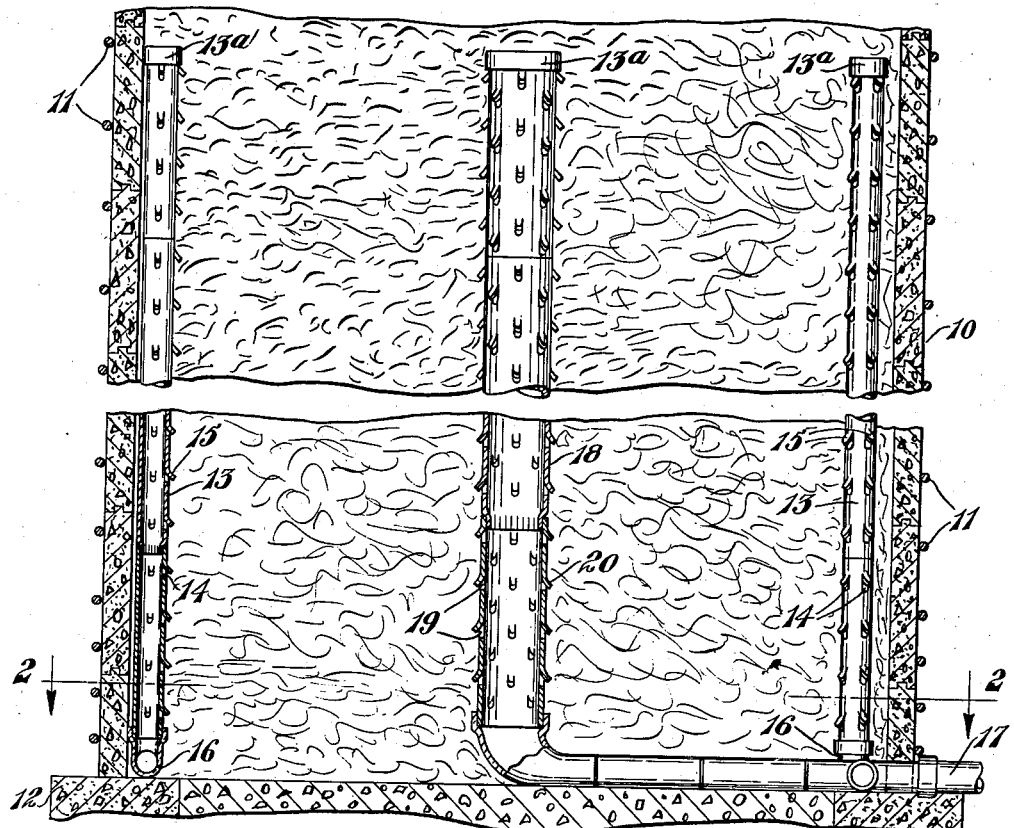
Figure 3:
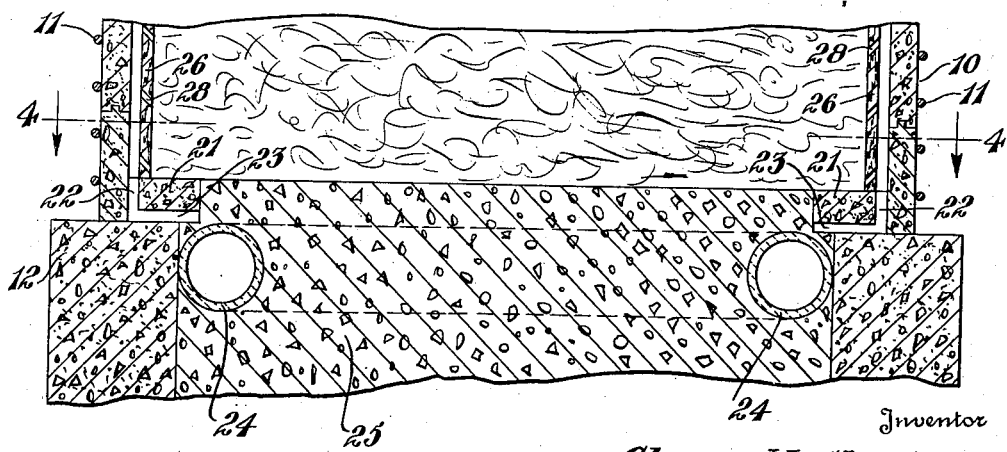
Fig. 3 is a fragmentary, vertical longitudinal section through the lower portion of a silo showing a modification of the invention, in which a perforate lining is provided inside of the silo walls.

Any usual and ordinary foundation may be provided for the silo as shown at 12 in Figs. 1, 3 and 7.

As shown in Figs. 1 and 2, the moisture may be drained by a plurality of pipes or tubes 13 located at intervals around the inside of the silo wall, each pipe being perforated throughout its length as indicated at 14 and having an overhanging, downwardly and outwardly disposed lip 15; drain tiles 16 being located beneath the pipes to carry away the moisture to a drain tile 17 or the like as shown in Fig. 2, which may extend to any suitable point at a distance from the silo.

In this form of the invention a single large pipe 18 may be located in the center of the silo and provided with a multiplicity of perforations 19 having overhanging lips 20.

The pipes 13 and 18 may extend up within the silo substantially twenty feet above the foundation.

Both the center pipe 18 and outer pipes 13 may be used together or either may be used separately depending upon the amount of moisture in the silage.

Removable caps 13a may be placed upon the pipes 13 and 18 to prevent silage from entering the pipes.

Any usual and ordinary foundation may be provided for the silo as shown at 12 in Figs. 3 and 4, and drainage tiles or blocks 21, as shown in detail in Fig. 5, may be placed upon the foundation, and provided with vertical drainage grooves or passages 22, adjacent to the inner walls of the silo and communicating at their lower ends with the substantially horizontal grooves or passages 23 terminating beyond the inner side of the foundation at the inner ends of the drainage tiles or blocks.

Below the drainage tiles, and adjacent to the inner sides of the foundation, are a series of drain tiles 24, with open joints as in usual and well-known manner, said open tiles being preferably embedded in gravel or the like, as shown at 25, whereby any moisture draining into the vertical grooves 22 will pass down through the horizontal grooves 23 and thence to the open tiles 24, which may drain down into the gravel 25, or if desired, these open tile may be connected to an outside drain as in Figs. 1 and 2, without in any way affecting the invention, which pertains to the drainage of moisture in the lower portion of the silo.

As shown in Figs. 3 and 4, the drainage may be taken care of by means of an inner lining spaced from the inner wall of the silo and formed of strips indicated generally at 26 of wood, plywood, fibreboard or the like having spacing strips or cleats 27 formed thereon or fixed thereto to space the same from the silo walls so as to provide drainage space between the silo walls and the inner lining through which the moisture may drain downward to the drainage tiles 21.

A great multiplicity of apertures 28 may be provided in the boards 26, these apertures preferably being inclined upward and outward so as to prevent clogging thereof by the chopped grass.

This inner lining may extend some twenty feet upward from the bottom of the silo and moisture in the silage from above this point may drain down the inner walls of the silo and through the vertical drainage space between the silo walls and the lining while moisture in the silage below the top of the lining may pass through the apertures 28 into the drainage space.

As shown in Fig. 6, the lining may be formed of sheet metal or the like indicated at 29 and vertically corrugated as shown and provided with a multiplicity of apertures 30 through which moisture from the silage may pass into the drainage passages 31 formed between the corrugations of the lining and the silo wall. Overhanging lips 32 may protect these apertures from clogging.

In Fig. 7, is shown a slightly different form of drainage tile 21a having a vertical groove 22a communicating with the space between the silo wall 10 and the inner lining 28, and communicating at its lower end with a horizontal groove or passage 23a, the inner end portion of the tile being inclined downward and inward as at 21b and having a groove 23b therein communicating with the horizontal groove 23a so as to drain the moisture to the open tile 24.

Where the invention is applied to old silos now in use, wherein no provision is made for drainage through the foundation, or where the surface condition of the location is such that no underground drainage can be had, the drainage can be arranged through the lower wall of the silo, as shown in Fig. 1, at any elevation above the ground which is necessary, and connected to a drain pipe or otherwise carried away from the silo.

I claim:

1. In a silo having a continuous, vertical wall, means spaced inwardly from the silo wall and extending from the bottom of the silo to a point spaced from the top and closed at its upper end and forming vertical drainage passages having a multiplicity of apertures forming communication between the interior of the silo and said drainage passages, and a drainage tile communicating with the lower end of said drainage passages for carrying away moisture from said drainage passages to a point outside of the silo.

2. In a silo having a continuous, vertical wall, an inner wall spaced from the silo wall and extending from the bottom of the silo to a point spaced from the top and closed at its upper end and forming vertical drainage passages having a multiplicity of apertures forming communication between the interior of the silo and said drainage passages, and a drainage tile communicating with the lower end of said drainage passages for carrying away moisture from said drainage passages to a point outside of the silo.

3. In a silo having a continuous, vertical wall, an inner wall spaced from the silo wall and extending from the bottom of the silo to a point spaced above the bottom and forming a vertical drainage passage having a multiplicity of apertures forming communication between the interior of the silo and said drainage passage, and drainage blocks having horizontal and vertical drainage passages communicating with the lower end of said drainage passage for carrying away moisture from said drainage passage.

4. In a silo having a continuous, vertical wall, a vertically corrugated inner wall around the interior of the silo wall and extending from the bottom of the silo to a point spaced above the bottom and forming a vertical drainage passage having a multiplicity of apertures forming communication between the interior of the silo and said drainage passage, and means communicating with the lower end of said drainage passage for carrying away moisture from said drainage passage.

5. In a silo having a continuous, vertical wall, a vertical tube extending from the bottom of the silo to a point spaced from the top and forming a vertical drainage passage having a multiplicity of apertures forming communication between the interior of the silo and said drainage passage, and a drainage tile communicating with the lower end of said drainage passage for carrying away moisture from said drainage passage to a point outside of the silo.

6. In a silo having a continuous, vertical wall, a centrally located vertical tube extending from the bottom of the silo to a point spaced from the top and forming a vertical drainage passage having a multiplicity of apertures forming communication between the interior of the silo and said drainage passage, and a drainage tile communicating with the lower end of said drainage passage for carrying away moisture from said drainage passage to a point outside of the silo.

7. In a silo having a continuous, vertical wall, vertical tubes located around the interior of the silo wall and extending from the bottom of the silo to a point spaced from the top and forming vertical drainage passages having a multiplicity of apertures forming communication between the interior of the silo and said drainage passages, and a drainage tile communicating with the lower end of said drainage passages for carrying away moisture from said drainage passages to a point outside of the silo.

8. In a silo having a continuous, vertical wall, a vertical tube extending from the bottom of the silo to a point spaced from the top and forming a vertical drainage passage having a multiplicity of apertures forming communication between the interior of the silo and said drainage passage, and a drainage tile communicating with the lower end of said drainage passage for carrying away moisture from said drainage passage to a point outside of the silo, and a removable cap upon the top of said tube.

9. In a silo having a continuous, vertical wall, a vertical tube extending from the bottom of the silo to a point spaced from the top and forming a vertical drainage passage having a multiplicity of apertures forming communication between the interior of the silo and said drainage passage, and a drainage tile communicating with the lower end of said drainage passage for carrying away moisture from said drainage passage to a point outside of the silo, and overhanging lips located over said apertures.

10. In a silo having a continuous vertical wall, vertical tubes located around the interior of the silo wall, a vertical tube in the center of the silo, all of said vertical tubes extending from the bottom of the silo to a point spaced from the top and forming vertical drainage passages having a multiplicity of apertures forming communication between the interior of the silo and the drainage passages, and a drainage tile communicating with the lower ends of all of said vertical tubes and extending through the wall of the silo for carrying away moisture from said drainage passages.

GLENN V. GLADVILLE.